United States Patent
Gamei et al.

(10) Patent No.: US 10,827,169 B2
(45) Date of Patent: Nov. 3, 2020

(54) METHOD AND APPARATUS FOR CHROMINANCE PROCESSING IN VIDEO CODING AND DECODING

(71) Applicant: Sony Corporation, Tokyo (JP)

(72) Inventors: James Alexander Gamei, Surrey (GB); Nicholas Ian Saunders, Basingstoke (GB); Karl James Sharman, Newbury (GB); Paul James Silcock, Swindon (GB)

(73) Assignee: Sony Corporation, Tokyo (JP)

( * ) Notice: Subject to any disclaimer, the term of this patent is extended or adjusted under 35 U.S.C. 154(b) by 1229 days.

(21) Appl. No.: 14/394,834

(22) PCT Filed: Apr. 26, 2013

(86) PCT No.: PCT/GB2013/051070
§ 371 (c)(1),
(2) Date: Oct. 16, 2014

(87) PCT Pub. No.: WO2013/160693
PCT Pub. Date: Oct. 31, 2013

(65) Prior Publication Data
US 2015/0063460 A1   Mar. 5, 2015

(30) Foreign Application Priority Data
Apr. 26, 2012   (GB) .................... 1207459.7

(51) Int. Cl.
*H04N 19/119*   (2014.01)
*H04N 19/103*   (2014.01)
(Continued)

(52) U.S. Cl.
CPC ........... *H04N 19/103* (2014.11); *H04N 19/11* (2014.11); *H04N 19/117* (2014.11);
(Continued)

(58) Field of Classification Search
CPC ...................................................... H04N 19/00
See application file for complete search history.

(56) References Cited

U.S. PATENT DOCUMENTS

| 6,078,694 A | 6/2000 | Takahashi et al. |
| 6,427,028 B1 | 7/2002 | Donescu et al. |

(Continued)

FOREIGN PATENT DOCUMENTS

| CN | 1692644 A | 11/2005 |
| CN | 1701616 A | 11/2005 |

(Continued)

OTHER PUBLICATIONS

U.S. Appl. No. 14/778,445, filed Sep. 18, 2015, Berry, et al.
(Continued)

*Primary Examiner* — Brian T Pendleton
*Assistant Examiner* — Kyle M Lotfi
(74) *Attorney, Agent, or Firm* — Oblon, McClelland, Maier & Neustadt, L.L.P.

(57) ABSTRACT

A method of video coding in respect of a 4:2:2 chroma subsampling format includes dividing image data into transform units. In a case of a non-square transform unit, the method includes splitting the non-square transform unit into square blocks prior to applying a spatial frequency transform. The method further includes applying a spatial frequency transform to the square blocks to generate corresponding sets of spatial frequency coefficients.

21 Claims, 14 Drawing Sheets

8x8 4:2:2 Luma

4x4 4:2:2 Chroma (Cb & Cr)

(51) Int. Cl.
| | |
|---|---|
| H04N 19/176 | (2014.01) |
| H04N 19/129 | (2014.01) |
| H04N 19/11 | (2014.01) |
| H04N 19/117 | (2014.01) |
| H04N 19/12 | (2014.01) |
| H04N 19/136 | (2014.01) |
| H04N 19/186 | (2014.01) |
| H04N 19/157 | (2014.01) |
| H04N 19/82 | (2014.01) |
| H04N 19/523 | (2014.01) |
| H04N 19/60 | (2014.01) |
| H04N 19/593 | (2014.01) |
| H04N 19/124 | (2014.01) |
| H04N 19/50 | (2014.01) |
| H04N 19/80 | (2014.01) |
| H04N 19/122 | (2014.01) |
| H04N 19/52 | (2014.01) |
| H04N 19/44 | (2014.01) |
| H04N 19/13 | (2014.01) |

(52) U.S. Cl.
CPC ........... *H04N 19/119* (2014.11); *H04N 19/12* (2014.11); *H04N 19/122* (2014.11); *H04N 19/124* (2014.11); *H04N 19/129* (2014.11); *H04N 19/136* (2014.11); *H04N 19/157* (2014.11); *H04N 19/176* (2014.11); *H04N 19/186* (2014.11); *H04N 19/44* (2014.11); *H04N 19/50* (2014.11); *H04N 19/52* (2014.11); *H04N 19/523* (2014.11); *H04N 19/593* (2014.11); *H04N 19/60* (2014.11); *H04N 19/649* (2014.11); *H04N 19/80* (2014.11); *H04N 19/82* (2014.11); *H04N 19/13* (2014.11)

(56) References Cited

U.S. PATENT DOCUMENTS

| | | | |
|---|---|---|---|
| 2005/0036065 A1* | 2/2005 | Hatti | H04N 7/012 348/453 |
| 2005/0271288 A1 | 12/2005 | Suzuki et al. | |
| 2009/0190829 A1 | 7/2009 | Suzuki et al. | |
| 2011/0007979 A1 | 1/2011 | Goma | |
| 2011/0122947 A1 | 5/2011 | Suzuki et al. | |
| 2011/0123103 A1 | 5/2011 | Suzuki et al. | |
| 2011/0123104 A1 | 5/2011 | Suzuki et al. | |
| 2011/0123105 A1 | 5/2011 | Suzuki et al. | |
| 2011/0123106 A1 | 5/2011 | Suzuki et al. | |
| 2011/0123107 A1 | 5/2011 | Suzuki et al. | |
| 2011/0123108 A1 | 5/2011 | Suzuki et al. | |
| 2011/0123109 A1 | 5/2011 | Suzuki et al. | |
| 2011/0246885 A1 | 10/2011 | Pantos et al. | |
| 2012/0008683 A1* | 1/2012 | Karczewicz | H04N 19/159 375/240.12 |
| 2012/0219216 A1 | 8/2012 | Sato | |
| 2013/0121423 A1 | 5/2013 | Gamei et al. | |
| 2013/0128958 A1 | 5/2013 | Gamei et al. | |
| 2013/0187796 A1* | 7/2013 | Kim | H03M 7/4018 341/51 |
| 2014/0286417 A1 | 9/2014 | Gamei et al. | |

FOREIGN PATENT DOCUMENTS

| | | | | |
|---|---|---|---|---|
| CN | 101176087 | A | 5/2008 | |
| CN | 102236502 | A | 11/2011 | |
| EP | 0 825 556 | A1 | 2/1998 | |
| EP | 0 838 953 | A2 | 4/1998 | |
| EP | 1950971 | A2 * | 7/2008 | ............ H04N 19/70 |
| JP | 7-121687 | A | 5/1995 | |
| JP | 2005-39743 | A | 2/2005 | |
| JP | 2010-56600 | A | 3/2010 | |
| JP | 2011-77761 | A | 4/2011 | |
| WO | WO 2011/061880 | A1 | 5/2011 | |
| WO | WO 2012/043989 | A2 | 4/2012 | |
| WO | WO 2013067174 | A1 * | 5/2013 | ........... H04N 19/176 |

OTHER PUBLICATIONS

U.S. Appl. No. 14/778,394, filed Sep. 18, 2015, Gamei, et al.
U.S. Appl. No. 14/779,502, filed Sep. 23, 2015, Berry, et al.
Japanese Office Action dated Dec. 22, 2015 in Patent Application No. 2015-507601 (English Translation only).
Panusopone, K., et al., "RQT with Rectangular Transform Unit Support", Joint Collaborative Team on Video Coding (JCT-VC) of ITU-T SG16 WP3 and ISO/IEC JTC1/SC29/WG11, Document JCTVC-F578-r3, Jul. 19, 2011, 9 pages.
Yuan Yuan, et al., "Asymmetric Motion Partition with OBMC and Non-Square TU", Joint Collaborative Team on Video Coding (JCT-VC) of ITU-T SG16 WP3 and ISO/IEC JTC1/SC29/WG11, Document: JCTVC-E376, Mar. 19, 2011, 10 pages.
Yuan Yuan, et al., "CE2: Non-Square Quadtree Transform for Symmetric and Asymmetric Motion Partition", Joint Collaborative Team on Video Coding (JCT-VC) of ITU-T SG16 WP3 and ISO/IEC JTC1/SC29/WG11, Document: JCTVC-F412, Jul. 12, 2011, 11 pages.
Ching-Yeh Chen, et al., "Non-CE8.c.7: Single-source SAO and ALF Virtual Boundary Processing with Cross9x9", Joint Collaborative Team on Video Coding (JCT-VC) of ITU-T SG16 WP3 and ISO/IEC JTC1/SC29/WG11, Document: JCTVC-G212, Nov. 29, 2011, 25 pages.
U.S. Appl. No. 14/355,143, filed Apr. 29, 2014, Gamei, et al.
U.S. Appl. No. 14/315,498, filed Jun. 26, 2014, Gamei, et al.
Combined Office Action and Search Report dated Jan. 26, 2017 in Chinese Patent Application No. 2013800218151 (submitting unedited computer generated English translation only).
Office Action dated Jan. 4, 2018 in Chinese Patent Application No. 2013800218151 (with English translation).
Office Action dated Oct. 16, 2017 in Canadian Application No. 2,870,591.
Office Action dated Feb. 3, 2017 in Chinese Patent Application No. 2013101081919 (English translation).
International Search Report dated Oct. 31, 2013 in PCT/GB2013/051070 filed Apr. 26, 2013.
Search Report dated Sep. 11, 2012 in United Kingdom Patent Application No. GB 1207459.7.
Joel Sole, et al., "CEI: Test 3—Square transform blocks for 4:2:2" Joint Collaborative Team on Video Coding (JCTV-VC) of ITU-T SG 16 WP 3 and ISO/IEC JTC 1/SC 29/WG 11, vol. JCTVC-L0333, XP030113821, Jan. 14-23, 2013, 4 Pages.
C. Rosewarne, et al., "CEI: Test 3—Square transforms for Range Extensions" Joint Collaborative Team on Video Coding (JCTV-VC) of ITU-T SG 16 WP 3 and ISO/IEC JTC 1/SC 29/WG 11, vol. JCTVC-L0148, XP030056052, Jan. 16-13, 2013, 4 Pages.
P. Silcock, et al. "Extension of HM7 to Support Additional Chroma Formats" Joint Collaborative Team on Video Coding (JCTV-VC) of ITU-T SG 16 WP 3 and ISO/IEC JTC 1/SC 29/WG 11, vol. JCTVC-J0191, XP030112553, Jul. 11-20, 2012, 16 Pages.
Mathias Wien, "Variable Block-Size Transforms for H.264/AVC" IEEE Transactions on Circuits and Systems for Video Technology, vol. 13, No. 7, XP011099253, Jul. 1, 2003, pp. 604-613.
"Chrominancy Processing in HEVC" Sony Internal PowerPoint Presentation, 2011, 48 Pages.

* cited by examiner

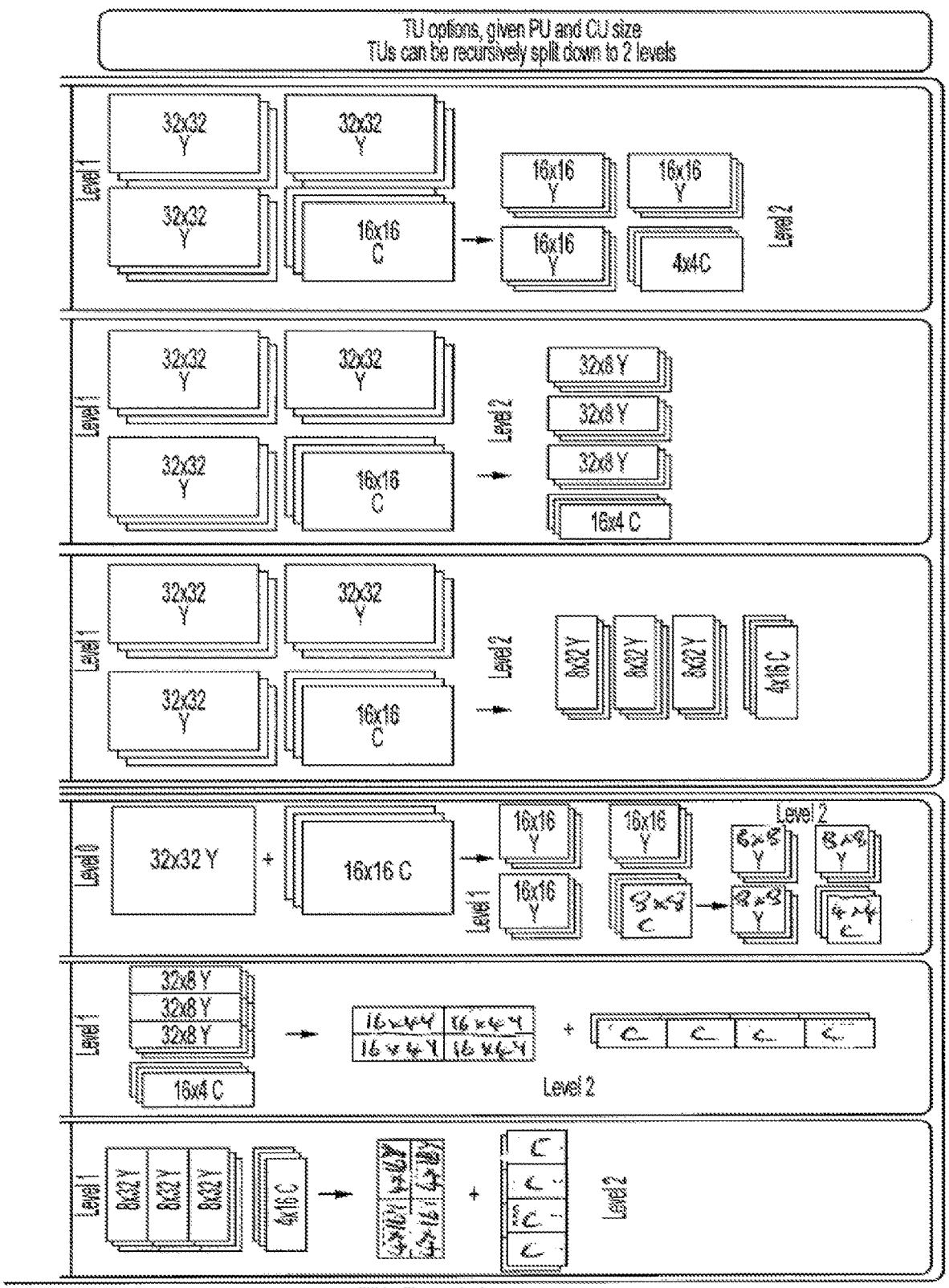
FIG. 1A (continued) PRIOR ART

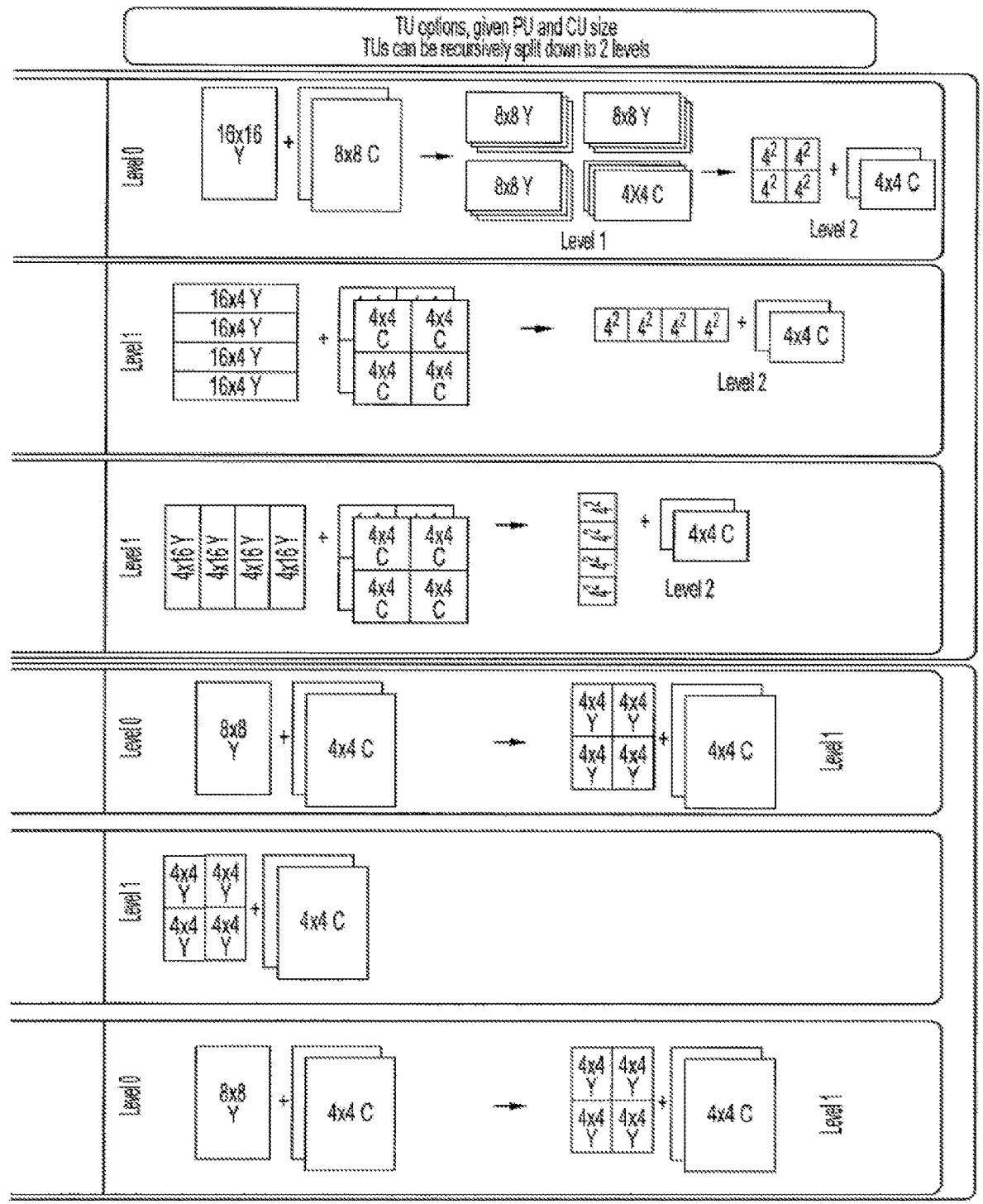
FIG. 1B (continued) PRIOR ART

| Index | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|
| Value | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |

| Index | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|---|---|---|---|---|---|---|---|---|
| Value | 26 | 27 | 28 | 29 | 29 | 30 | 31 | 32 | 32 | 33 | 34 | 34 | 35 | 35 | 36 | 36 | 37 | 37 | 37 | 38 | 38 | 38 | 39 | 39 | 39 | 39 |

FIG. 5

Recursively split a largest coding unit down to a coding unit of 4x4 pixels. — s710

FIG. 7A

Provide respective coding unit tree hierarchies for each channel — s720

FIG. 7B

Enable non-square quad-tree transforms — s732

Enable asymmetric motion partitioning — s734

Select transform unit block size to align with a resulting asymmetric prediction unit block layout — s736

FIG. 7C

Associate intra-prediction mode angles for square prediction units with different intra-prediction mode angles for non-square prediction units — s740

FIG. 7D

Provide respective intra-prediction modes for two or more prediction units in a coding unit. — s750

FIG. 7E

Treat luma QP values as chroma QP values — s860

FIG. 7O

Define a quantisation matrix as difference values with respect to a quantisation matrix defined for a different chroma subsampling format. — s870

FIG. 7P

Map an entropy encoding context variable from a luma context variable map for use with a chroma transform unit — s880

Entropy encode one or more coefficients of a chroma transform unit using the mapped context variable — s890

FIG. 7Q

Entropy encode coefficients of luma and chroma transform units — s910

Code the last significant position for chroma transform units differentially from the last significant position in the co-located luma transform unit — s920

FIG. 7R

Enable adaptive loop filtering — s930

Categorise respective chroma samples into one of a plurality of categories each having a respective filter — s940

FIG. 7S

METHOD AND APPARATUS FOR CHROMINANCE PROCESSING IN VIDEO CODING AND DECODING

CROSS REFERENCE TO RELATED APPLICATIONS

The present application claims the benefit of the earlier filing date of GB 1207459.7 filed in the United Kingdom Intellectual Property Office on 26 Apr. 2012, the entire content of which application is incorporated herein by reference.

BACKGROUND

Field

The present disclosure relates to a method and apparatus for chrominance processing in video coding and decoding.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly or impliedly admitted as prior art against the present disclosure.

Current video codecs (coders-decoders) such as H.264/MPEG-4 Advanced Video Coding (AVC) achieve data compression primarily by only encoding the differences between successive video frames. These codecs use a regular array of so-called macroblocks, each of which is used as a region of comparison with a corresponding macroblock in a previous video frame, and the image region within the macroblock is then encoded according to the degree of motion found between the corresponding current and previous macroblocks in the video sequence, or between neighbouring macroblocks within a single frame of the video sequence.

High Efficiency Video Coding (HEVC), also known as H.265 or MPEG-H Part 2, is a proposed successor to H.264/MPEG-4 AVC. It is intended for HEVC to improve video quality and double the data compression ratio compared to H.264, and for it to be scalable from 128×96 to 7680×4320 pixels resolution, roughly equivalent to bit rates ranging from 128 kbit/s to 800 Mbit/s.

HEVC replaces the macroblocks found in existing H.264 and MPEG standards with a more flexible scheme based upon coding units (CUs), which are variable size structures.

Consequently, when encoding the image data in video frames, the CU sizes can be selected responsive to the apparent image complexity or detected motion levels, instead of using uniformly distributed macroblocks. Consequently far greater compression can be achieved in regions with little motion between frames and with little variation within a frame, whilst better image quality can be preserved in areas of high inter-frame motion or image complexity.

Each CU contains one or more variable-block-sized prediction units (PUs) of either intra-picture or inter-picture prediction type, and one or more transform units (TUs) which contain coefficients for spatial block transform and quantization.

The goal of a PU is to encompass an area of the image where all the samples have either a common motion relative to a previously encoded image (inter-frame coding) or a consistent relationship to the samples immediately adjacent to the PU (intra-frame coding). In this way, the maximum amount of information is removed from the encompassed area prior to the spatial frequency transform. The PU level is where the parameters that define the prediction operation are specified.

Similarly, the goal of a TU is to encompass the largest possible area containing the fewest different spatial frequencies. The selection of TU size is a trade-off between the amount of image data that can be coded (hence the largest possible size) and the number of bits required to do so (hence the fewest different spatial frequencies). In detailed areas of the image, the TUs must be small as only small regions of samples will share similar characteristics. Conversely, in flat areas, the TUs can be large as all the samples share similar characteristics.

In addition, TU size is governed by practical limitations on the size of a transform, as the TU size increases, the complexity of calculation of the transform increases exponentially. It is also desirable from an implementation standpoint to have only a few different preset sizes so that fewer transform matrices need to be stored and so that each size can be computed using its own specialised hardware/software. In AVC, only 4×4 and 8×8 transforms were possible; in HEVC, this has been extended to include 16×16 and 32×32 transforms as well.

Moreover, PU and TU blocks are provided for each of three channels; Luma (Y), being a luminance or brightness channel, and which may be thought of as a greyscale channel, and two colour difference or chrominance (chroma) channels; Cb and Cr. These channels provide the colour for the greyscale image of the luma channel. The terms Y and luma are used interchangeably herein, and similarly the terms Cb and Cr, and chroma, are used interchangeably as appropriate.

In HEVC a so-called 4:2:0 block structure is proposed for consumer equipment, in which the amount of data used in each chroma channel is one quarter that in the luma channel. This is because subjectively people are more sensitive to brightness variations than to colour variations, and so it is possible to use greater compression and/or less information in the colour channels without a subjective loss of quality.

However, for professional broadcast and digital cinema equipment, it is desirable to have less compression (or more information) in the chroma channels, and this may affect how current processing such as HEVC processing operates.

SUMMARY

The present disclosure addresses or mitigates problems arising from this processing.

Respective aspects and features of the present disclosure are defined in the appended claims.

It is to be understood that both the foregoing general description and the following detailed description are exemplary, but are not restrictive, of the present technology.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 5 is a schematic diagram of a quantisation parameter association table for the 4:2:0 scheme in HEVC.

DESCRIPTION OF THE EMBODIMENTS

Figure 1A:
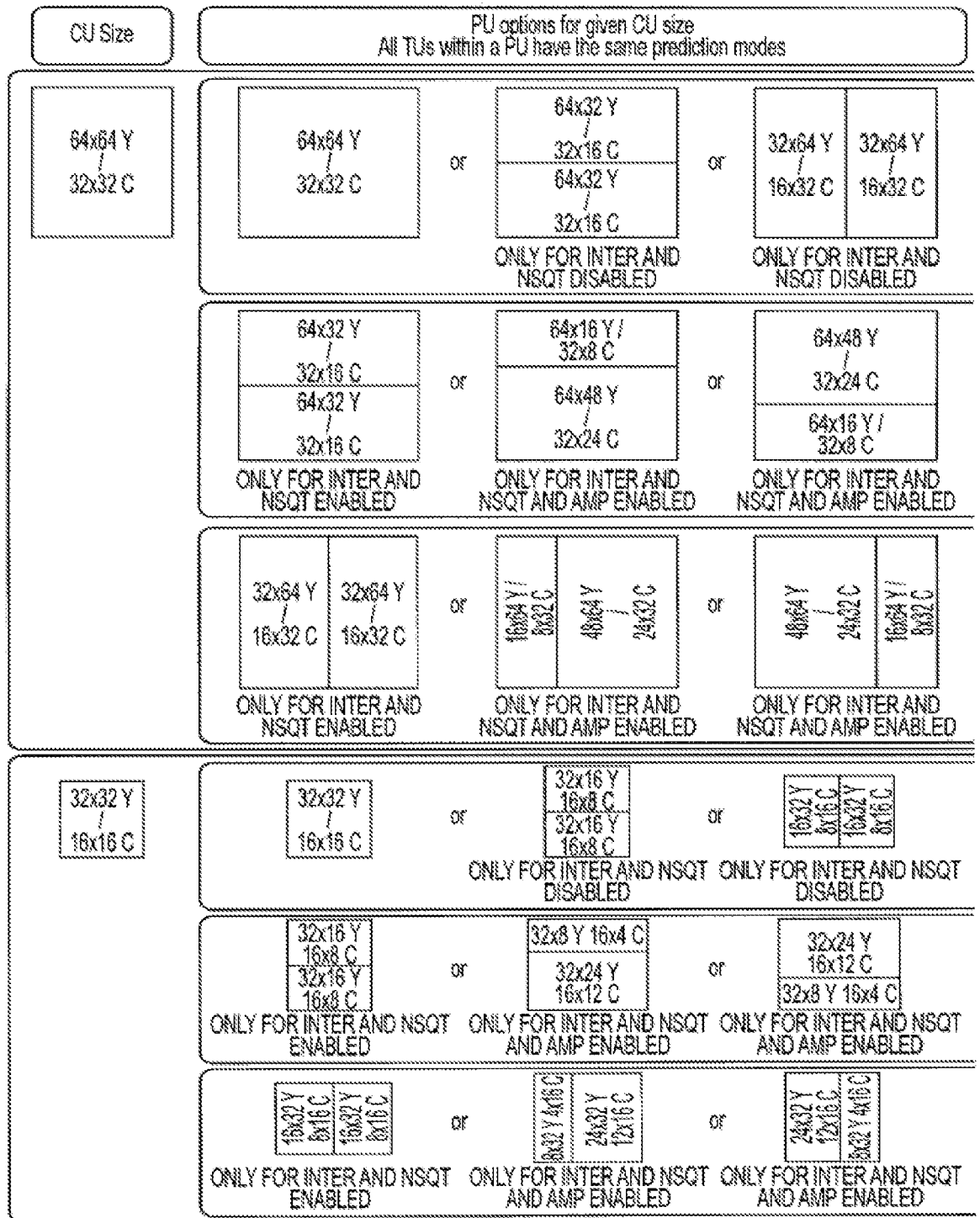
FIG. 1A is a schematic diagram of coding unit, prediction unit and transform unit block sizes for different 4:2:0 scheme CU sizes in HEVC.

An apparatus and methods for chrominance processing in high efficiency video codecs are disclosed. In the following description, a number of specific details are presented in order to provide a thorough understanding of the embodiments of the present disclosure. It will be apparent, however, to a person skilled in the art that these specific details need not be employed to practice the present disclosure. Conversely, specific details known to the person skilled in the art are omitted for the purposes of clarity where appropriate.

So-called high efficiency codecs according to the HEVC standards and/or proposals will be described purely by way of example. The terms HEVC or "high efficiency" are not to be considered limiting on the technical nature of the present disclosure or the embodiments.

Video coding and decoding of the type of be discussed below makes use of a forward encoding path which encodes a residual image block representing differences between an image block and a predicted version of that image block. The image block used in generating the predicted image block is actually a decoded version of the image block rather than the original image block. The reason for this is to ensure that the encoder and the decoder are both working with the same source data, given that the original input image block is not available at the decoder. So, an encoder also includes a reverse decoding path, as described below with reference to FIG. 6. The operation of the reverse decoding path of an encoder and the corresponding forward decoding path of a decoder should be the same. For this reason, at least some of the technical features to be described below in the context of an encoder (for example those relating to the prediction of image blocks) are also applicable to the operation of a decoder. Where appropriate, both an encoder and a decoder are considered as embodiments of the present disclosure.

Block Structure

As noted above, the proposed HEVC standard uses a particular chroma sampling scheme known as the 4:2:0 scheme. The 4:2:0 scheme can be used for domestic/consumer equipment. However, several other schemes are possible.

In particular, a so-called 4:4:4 scheme would be suitable for professional broadcasting, mastering and digital cinema, and in principle would have the highest quality and data rate.

Similarly, a so-called 4:2:2 scheme could be used in professional broadcasting, mastering and digital cinema with some loss of fidelity.

These schemes and their corresponding PU and TU block structures are described below.

In addition, other schemes include the 4:0:0 monochrome scheme.

In the 4:4:4 scheme, each of the three Y, Cb and Cr channels have the same sample rate. In principle therefore, in this scheme there would be twice as much chroma data as luma data.

Hence in HEVC, in this scheme each of the three Y, Cb and Cr channels would have PU and TU blocks that are the same size; for example an 8×8 luma block would have corresponding 8×8 chroma blocks for each of the two chroma channels.

Consequently in this scheme there would generally be a direct 1:1 relationship between block sizes in each channel.

In the 4:2:2 scheme, the two chroma components are sampled at half the sample rate of luma (for example using vertical or horizontal subsampling). In principle therefore, in this scheme there would be as much chroma data as luma data.

Hence in HEVC, in this scheme the Cb and Cr channels would have different size PU and TU blocks to the luma channel; for example an 8×8 luma block could have corresponding 4 wide×8 high chroma blocks for each chroma channel.

Notably therefore in this scheme the chroma blocks would be non-square.

In the currently proposed HEVC 4:2:0 scheme, the two chroma components are sampled at a quarter of the sample rate of luma (for example using vertical and horizontal subsampling). In principle therefore, in this scheme there is half as much chroma data as luma data.

Hence in HEVC, in this scheme again the Cb and Cr channels have different size PU and TU blocks to the luma channel. For example an 8×8 luma block would have corresponding 4×4 chroma blocks for each chroma channel. Consequently in general all of the CU, PU and TU blocks in this scheme are square, in particular for intra-prediction.

The above schemes are colloquially known in the art as 'channel ratios', as in 'a 4:2:0 channel ratio'; however it will be appreciated from the above description that in fact this does not always mean that the Y, Cb and Cr channels are compressed or otherwise provided in that ratio. Hence whilst referred to as a channel ratio, this should not be assumed to be literal. In fact, the ratios for the 4:2:0 scheme are 4:1:1 (the ratios for the 4:2:2 scheme and 4:4:4 scheme are in fact correct).

4:2:0 Block Structure

Figure 1B:
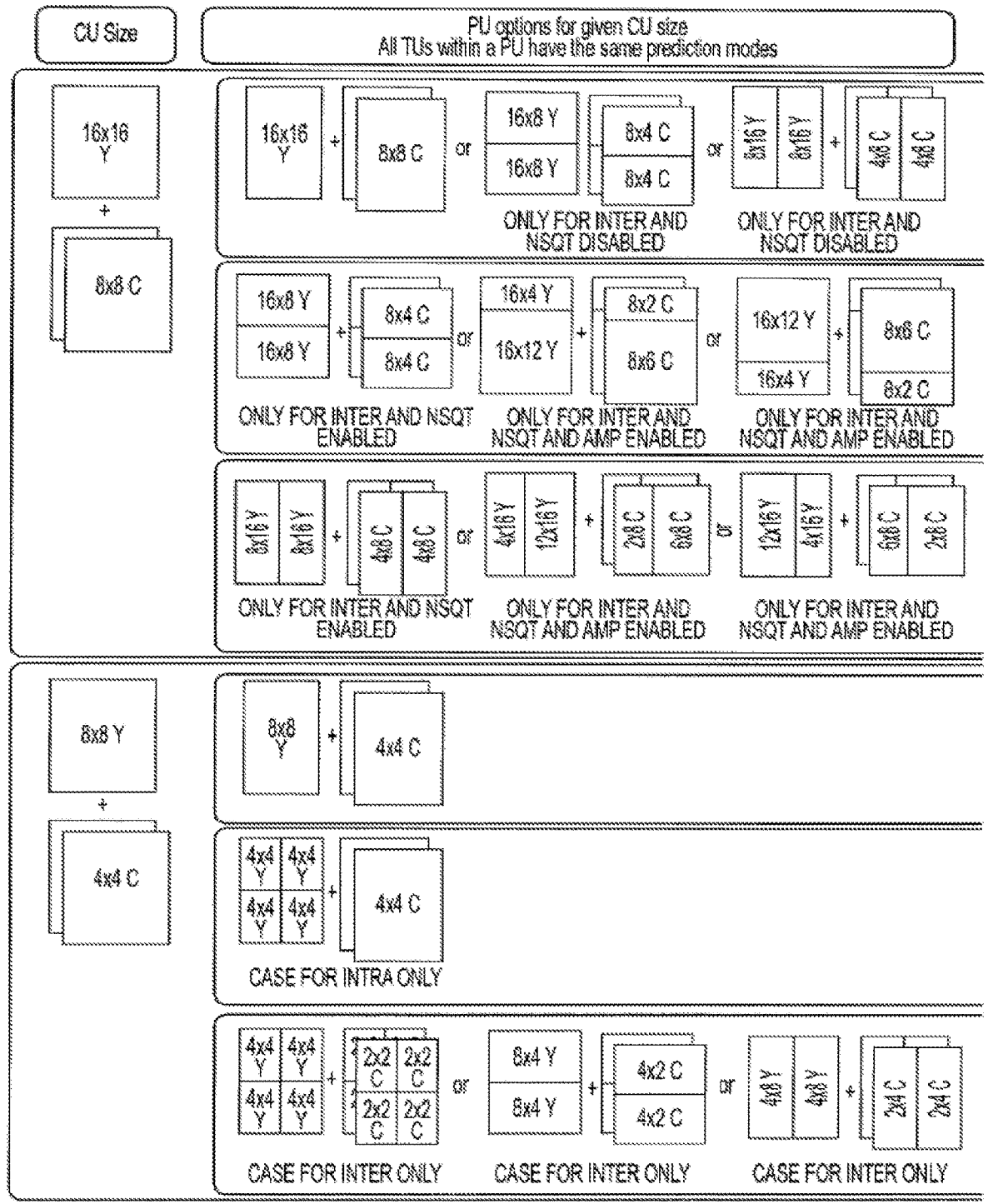
FIG. 1B is a schematic diagram of coding unit, prediction unit and transform unit block sizes for different 4:2:0 scheme CU sizes in HEVC.

Referring to FIGS. 1A and 1B, the different block sizes possible for the 4:2:0 scheme are summarised for CU, PU and TU blocks, with 'Y' referring to luma blocks and 'C' referring to both chroma blocks, and the numbers referring to pixels. 'Inter' refers to inter-frame prediction PUs (as opposed to intra-frame prediction PUs).

Briefly, the Largest Coding Unit (LCU) is the root picture object. It typically covers an area equivalent to 64×64 luma pixels and is recursively split to form a tree-hierarchy of Coding Units (CUs) being either 64×64, 32×32, 16×16 or 8×8 pixels. The three channels have the same CU tree-hierarchy. The smallest permitted recursion is down to a CU of 8×8 pixels.

The leaf CUs are then split into Prediction Units (PUs). The three channels have the same PU structure (with one possible exception where PUs are 4×4 luma Pixels for intra-prediction).

These leaf CUs are also split into Transform Units (TUs), which can in turn be split again, up to a maximum of 16 TUs per CU. Smallest TU size is 4×4 pixels; the largest is 32×32 pixels. The three channels have the same TU structure (again with one possible exception where TUs are 4×4 luma Pixels).

4:4:4 Block Structure Variants

It has been appreciated that both 4:2:0 and 4:4:4 schemes have square PU blocks for intra-prediction coding. Moreover, currently the 4:2:0 scheme permits 4×4 pixel PU & TU blocks.

In an embodiment of the present disclosure, it is consequently proposed that for the 4:4:4 scheme the recursion for CU blocks is permitted down to 4×4 pixels rather than 8×8 pixels, since as noted above in the 4:4:4 mode the luma and chroma blocks will be the same size (the chroma data is not subsampled) and so for a 4×4 CU no PU or TU will need to be less than the already allowed minimum of 4×4 pixels.

Similarly, in the 4:4:4 scheme, in an embodiment of the present disclosure each of the Y, Cr, Cb channels, or the Y and the two Cr, Cb channels together, could have respective CU tree-hierarchies. A flag may then be used to signal which hierarchy or arrangement of hierarchies is to be used. This approach could also be used for a 4:4:4 RGB colour space scheme.

4:2:2 Block Structure Variants

In the example of an 8×8 CU in the 4:2:0 scheme, this results in four 4×4 luma PUs and one 4×4 chroma PU. Hence in the 4:2:2 scheme, having twice as much chroma data, one option is in this case is to have two 4×4 chroma PUs. However, it is has been appreciated that using one non-square 4×8 chroma PU in this case would be more consistent with other non-square 4:2:2 PUs.

As can be seen from FIGS. 1A and 1B, in the 4:2:0 scheme there are in principle some non-square TU blocks permitted for certain classes of inter-prediction coding, but not for intra-prediction coding. However in inter-prediction coding, when non-square quad-tree transforms (NSQT) are disabled (which is the current default for the 4:2:0 scheme), all TUs are square. Hence in effect the 4:2:0 scheme currently enforces square TUs. For example, a 16×16 4:2:0 luma TU would correspond with respective Cb & Cr 8×8 4:2:0 Chroma TUs.

However, as noted previously, the 4:2:2 scheme can have non-square PUs. Consequently in an embodiment of the present disclosure it is proposed to allow non-square TUs for the 4:2:2 scheme.

For example, whilst a 16×16 4:2:2 luma TU could correspond with two 8×8 4:2:2 chroma TUs for each chroma channel (Cb & Cr), in this embodiment it could instead correspond with one 8×16 4:2:2 chroma TU for each chroma channel (Cb & Cr).

Similarly, four 4×4 4:2:2 luma TUs could correspond with two 4×4 4:2:2 chroma TUs for each chroma channel (Cb & Cr), or in this embodiment could instead correspond with one 4×8 4:2:2 chroma TU for each chroma channel (Cb & Cr). Here, the 4×8 TU is an example of a rectangular TU. It is an example of a 4:2:2 TU which has twice as many samples in a vertical direction as in a horizontal direction. Other sizes of TU may be used, for example other rectangular TUs and/or other TUs which have twice as many samples in a vertical direction as in a horizontal direction. For example, the following sizes may be considered: 2×4, 8×16, 16×32 and so on.

Having non-square chroma TUs, and hence fewer TUs, may be more efficient as they are likely to contain less information. However this may affect the transformation and scanning processes of such TUs, as will be described later.

Finally, for the 4:4:4 scheme it may be preferable to have the TU structure channel-independent, and selectable at the sequence, picture, slice or finer level.

As noted above, NSQT is currently disabled in the 4:2:0 scheme of HEVC. However, if for inter-picture prediction, NSQT is enabled and asymmetric motion partitioning (AMP) is permitted, this allows for PUs to be partitioned asymmetrically; thus for example a 16×16 CU may have a 4×16 PU and a 12×16 PU. In these circumstances, further considerations of block structure are important for each of the 4:2:0 and 4:2:2 schemes.

For the 4:2:0 scheme, in NSQT the minimum width/height of a TU is restricted to 4 luma/chroma samples:

Hence in a non-limiting example a 16×4/16×12 luma PU structure has four 16×4 luma TUs and four 4×4 chroma TUs, where the luma TUs are in a 1×4 vertical block arrangement and the chroma TUs are in a 2×2 block arrangement.

In a similar arrangement where the partitioning was vertical rather than horizontal, a 4×16/12×16 luma PU structure has four 4×16 luma TUs and four 4×4 chroma TUs, where the luma TUs are in a 4×1 horizontal block arrangement and the chroma TUs are in a 2×2 block arrangement.

For the 4:2:2 scheme, in NSQT as a non-limiting example a 4×16/12×16 luma PU structure has four 4×16 luma TUs and four 4×8 chroma TUs, where the luma TUs are in a 4×1 horizontal block arrangement; the chroma TUs are in a 2×2 block arrangement.

However, it has been appreciated that a different structure can be considered for some cases. Hence in an embodiment of the present disclosure, in NSQT as a non-limiting example 16×4/16×12 luma PU structure has four 16×4 luma TUs and four 8×4 chroma TUs, but now the luma and chroma TUs are in a 1×4 vertical block arrangement, aligned with the PU layout (as opposed to the 4:2:0 style arrangement of four 4×8 chroma TUs in a 2×2 block arrangement).

Similarly 32×8 PU can have four 16×4 luma TUs and four 8×4 chroma TUs, but now the luma and chroma TUs are in a 2×2 block arrangement.

Hence more generally, for the 4:2:2 scheme, in NSQT the TU block sizes are selected to align with the asymmetric PU block layout. Consequently the NSQT usefully allows TU boundaries to align with PU boundaries, which reduces high frequency artefacts that may otherwise occur.

Intra-Prediction

4:2:0 Intra-Prediction

Figure 2:
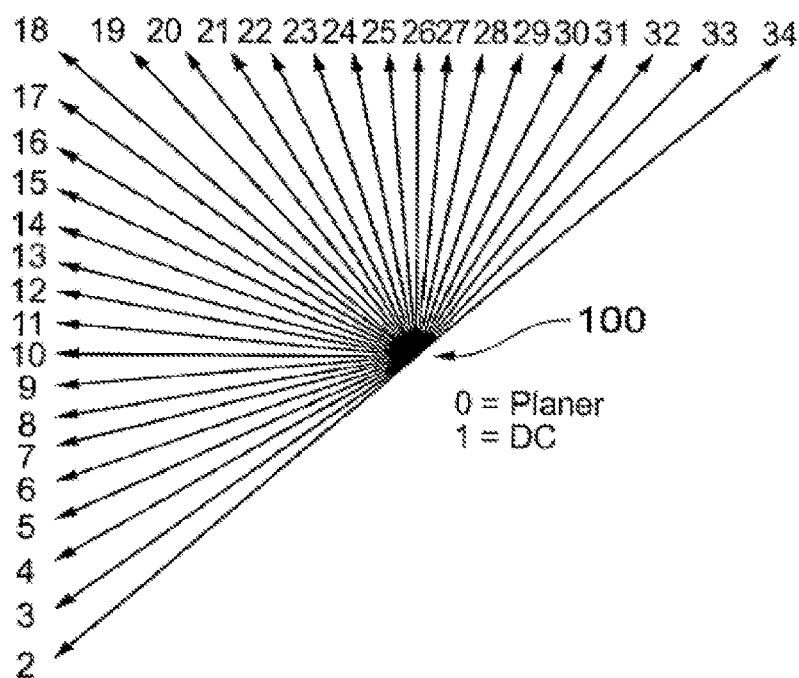
FIG. 2 is a schematic diagram of intra-prediction mode directions for the 4:2:0 scheme in HEVC.

Turning now to FIG. 2, for intra-prediction, HEVC allows for angular chroma prediction. FIG. 2 illustrates 35 prediction modes, 33 of which specify directions to reference samples for a current predicted sample position 100.

HEVC allows chroma to have DC, Vertical, Horizontal, Planar, DM_CHROMA and LM_CH ROMA modes.

DM_CHROMA indicates that the prediction mode to be used is the same as that of the co-located luma PU (one of the 35 shown in FIG. 2).

LM_CHROMA indicates that co-located luma samples are used to derive the predicted chroma samples. In this case, if the luma PU from which the DM_CHROMA prediction mode would be taken selected DC, Vertical, Horizontal or Planar, that entry in the chroma prediction list is replaced using mode 34.

It is notable that the prediction modes 2-34 sample an angular range from 45 degrees to 225 degrees; that is to say, one diagonal half of a square. This is useful in the case of the 4:2:0 scheme, which as noted above only uses square chroma PUs for intra-picture prediction.

4:2:2 Intra-Prediction Variants

However, also as noted above the 4:2:2 scheme could have rectangular (non-square) chroma PUs.

Consequently, in an embodiment of the present disclosure, for rectangular chroma PUs, a mapping table may be required for the direction. Assuming a 1-to-2 aspect ratio for rectangular PUs, then for example mode 18 (currently at an angle of 135 degrees) may be re-mapped to 123 degrees. Alternatively selection of current mode 18 may be remapped to a selection of current mode 22, to much the same effect.

Hence more generally, for non-square PUs, a different mapping between the direction of the reference sample and the selected intra prediction mode may be provided compared with that for square PUs.

More generally still, any of the modes, including the non-directional modes, may also be re-mapped based upon empirical evidence.

It is possible that such mapping will result in a many-to-one relationship, making the specification of the full set of modes redundant for 4:2:2 chroma PUs. In this case, for example it may be that only 17 modes (corresponding to half the angular resolution) are necessary. Alternatively or in addition, these modes may be angularly distributed in a non-uniform manner.

Similarly, the smoothing filter used on the reference sample when predicting the pixel at the sample position may be used differently; in the 4:2:0 scheme it is only used to smooth luma pixels, but not chroma ones. However, in the 4:2:2 and 4:4:4 schemes this filter may also be used for the chroma PUs. In the 4:2:2 scheme, again the filter may be modified in response to the different aspect ratio of the PU, for example only being used for a subset of near horizontal modes. An example subset of modes is preferably 2-18 and 34, or more preferably 7-14.

4:4:4 Intra-Prediction Variants

In the 4:4:4 scheme, the chroma and luma PUs are the same size, and so the intra-prediction mode for a chroma PU can be either the same as the co-located luma PU (so saving some overhead in the bit stream), or more preferably, it can be independently selected.

In this latter case therefore, in an embodiment of the present disclosure one may have 1, 2 or 3 different prediction modes for the PUs in a CU;

In a first example, the Y, Cb and Cr PUs may all use the same intra-prediction mode.

In a second example, the Y PU may use one intra-prediction mode, and the Cb and Cr PUs both use another independently selected intra-prediction mode.

In a third example, the Y, Cb and Cr PUs each use a respective independently selected intra-prediction mode.

It will be appreciated that having independent prediction modes for the chroma channels (or each chroma channel) will improve the colour prediction accuracy.

The selection of the number of modes could be indicated in the high-level syntax (for example at sequence, picture, or slice level). Alternatively, the number of independent modes could be derived from the video format; for example, GBR could have up to 3, whilst YCbCr could be restricted to up to 2.

In addition to independently selecting the modes, the available modes may be allowed to differ from the 4:2:0 scheme in the 4:4:4 scheme.

For example as the luma and chroma PUs are the same size, the chroma PU may benefit from access to all of the 35+LM_CHROMA+DM_CHROMA directions available. Hence for the case of Y, Cb and Cr each having independent prediction modes, then the Cb channel could have access to DM_CHROMA & LM_CHROMA, whilst the Cr channel could have access to DM_CHROMA_Y, DM_CHROMA_Cb, LM_CHROMA_Y and LM_CHROMA_Cb, Where these replace references to the Luma channel with references to the Y or Cb chroma channels.

Where the luma prediction modes are signalled by deriving a list of most probable modes and sending an index for that list, then if the chroma prediction mode(s) are independent, it may be necessary to derive independent lists of most probable modes for each channel.

Finally, in a similar manner to that noted for the 4:2:2 case above, in the 4:4:4 scheme the smoothing filter used on the reference sample when predicting the pixel at the sample position may be used for chroma PUs in a similar manner to luma PUs.

Inter-Prediction

Each frame of a video image is a discrete sampling of a real scene, and as a result each pixel is a step-wise approximation of a real-world gradient in colour and brightness.

In recognition of this, when predicting the Y, Cb or Cr value of a pixel in a new video frame from a value in a previous video frame, the pixels in that previous video frame are interpolated to create a better estimate of the original real-world gradients, to allow a more accurate selection of brightness or colour for the new pixel. Consequently the motion vectors used to point between video frames are not limited to an integer pixel resolution. Rather, they can point to a sub-pixel position within the interpolated image.

4:2:0 Inter-Prediction

Figure 3:
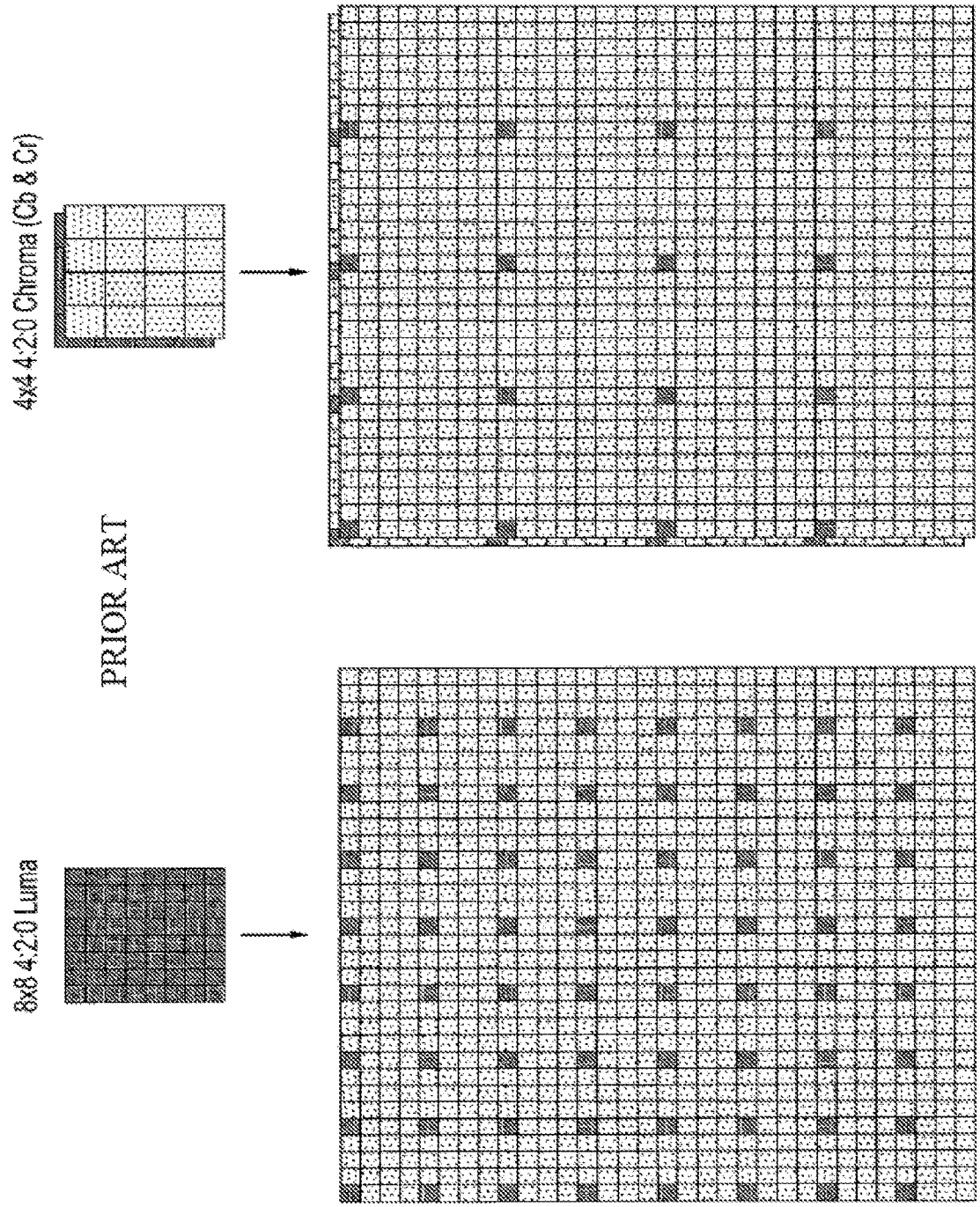
FIG. 3 is a schematic diagram illustrating 4:2:0 scheme luma and chroma PU interpolation for selection by motion vectors.

Referring now to FIG. 3, in the 4:2:0 scheme as noted above typically an 8×8 luma PU will be associated with Cb and Cr 4×4 chroma PUs. Consequently to interpolate the luma and chroma pixel data up to the same effective resolution, different interpolation filters are used.

For example for the 8×8 4:2:0 luma PU, interpolation is ¼ pixel, and so an 8-tap×4 filter is applied horizontally first, and then the same 8-tap×4 filter is applied vertically, so that the luma PU is effectively stretched 4 times in each direction, as shown in FIG. 3. Meanwhile the corresponding 4×4 4:2:0 chroma PU is ⅛ pixel interpolated to generate the same eventual resolution, and so a 4-tap×8 filter is applied horizontally first, then the same 4-tap×8 filter is applied vertically, so that the chroma PUs are effectively stretched 8 times in each direction, as also shown in FIG. 3.

4:2:2 Inter-Prediction Variants

Figure 4:
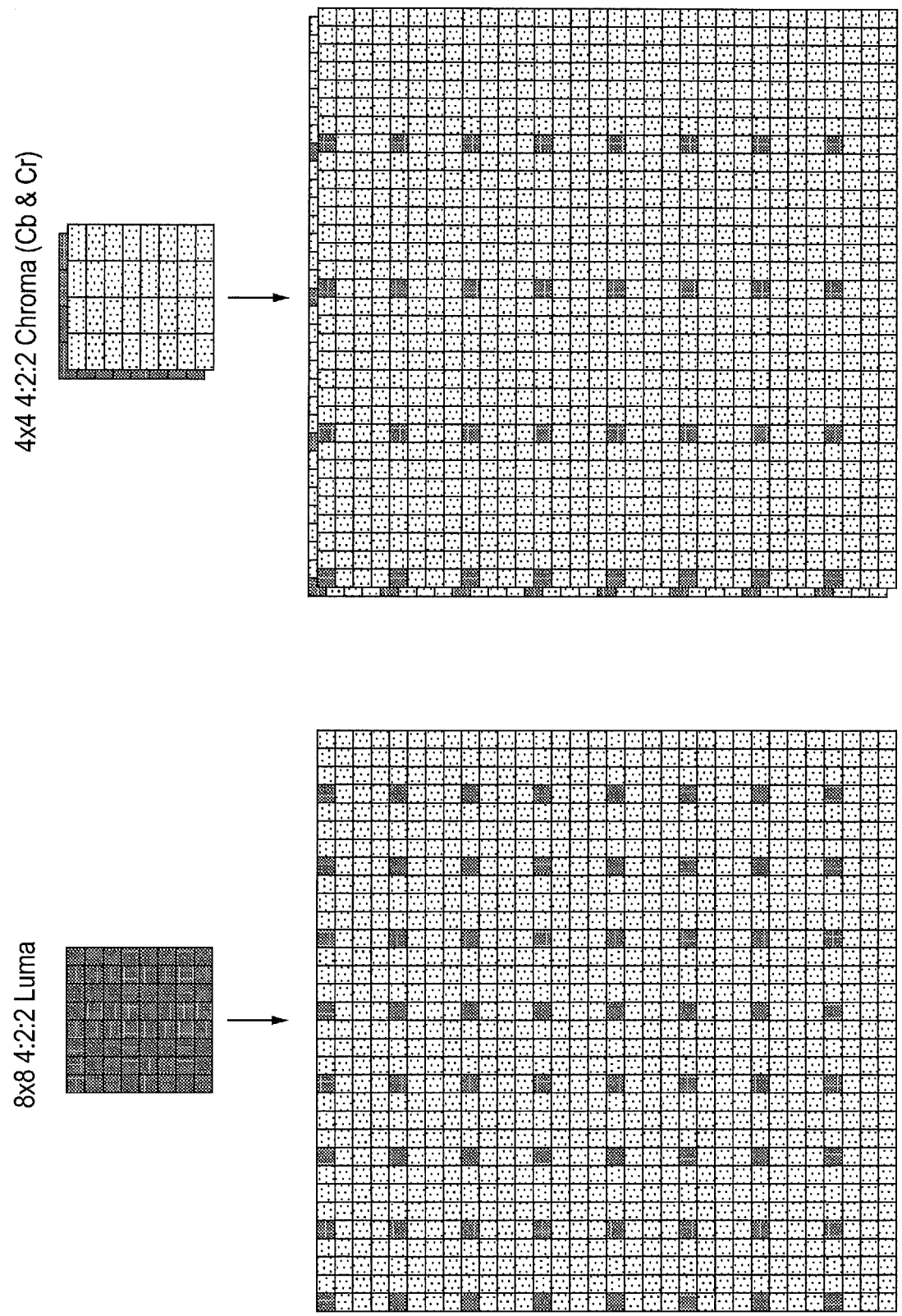
FIG. 4 is a schematic diagram illustrating 4:2:2 scheme luma and chroma PU interpolation for selection by motion vectors in accordance with an embodiment of the present disclosure.

Referring now also to FIG. 4, as noted previously, in the 4:2:2 scheme the chroma PU can be non-square, and for the case of an 8×8 4:2:2 luma PU, will typically be a 4 wide×8 high 4:2:2 Chroma PU for each of the Cb and Cr channels, as shown in FIG. 4.

Whilst it may be possible therefore to use the existing 8-tap×4 luma filter vertically on the chroma PU, in an embodiment of the present disclosure it has been appreciated that the existing 4-tap×8 chroma filter would suffice for vertical interpolation as in practice one is only interested in the even fractional locations of the interpolated chroma PU.

Hence FIG. 4 shows the 8×8 4:2:2 luma PU interpolated as before with an 8-tap×4 filter, and the 4×8 4:2:2 chroma PUs interpolated with the existing 4-tap×8 chroma filter in the horizontal and vertical direction, but only with the even fractional results used for form the interpolated image in the vertical direction.

4:4:4 Inter-Prediction Variants

By extension, the same principle of only using the even fractional results for the existing 4-tap×8 chroma filter can be applied both vertically and horizontally for the 8×8 4:4:4 chroma PUs.

Further Inter-Prediction Variants

In one implementation of motion vector (MV) derivation, one vector is produced for a PU in a P-slice (and two vectors for a PU in a B-slice (where a P-slice takes predictions from a preceding frame, and a B-slice takes predictions from a preceding and following frame, in a similar manner to MPEG P and B frames). Notably, in this implementation in the 4:2:0 scheme the vectors are common to all channels, and moreover, the chroma data is not used to calculate the motion vectors. In other words, all the channels use a motion vector based on the luma data.

In an embodiment of the present disclosure, in the 4:2:2 scheme the chroma vector could be independent from luma (a vector for the Cb and Cr channels could be derived separately), and in the 4:4:4 scheme chroma vectors could further be independent for each of the Cb and Cr channels.

Transforms

In HEVC, most images are encoded using motion vectors with respect to previously encoded/decoded frames, with the motion vectors telling the decoder where, in these other decoded frames, to copy good approximations of the current image from. The result is an approximate version of the current image. HEVC then encodes the so-called residual, which is the error between that approximate version and the correct image. This residual requires much less information than specifying the actual image directly. However, it is still generally preferable to compress this residual information to reduce the overall bitrate further.

In many encoding methods including HEVC, such data is transformed into the spatial frequency domain using an integer cosine transform (ICT), and typically some compression is then achieved by retaining low spatial frequency data and discarding higher spatial frequency data according to the level of compression desired.

4:2:0 Transforms

The spatial frequency transforms used in HEVC are conventionally ones that generate coefficients in powers of 4 (for example 64 frequency coefficients) as this is particularly amenable to common quantisation/compression methods. The square TUs in the 4:2:0 scheme are all powers of 4 and hence this is straightforward to achieve.

Even in the case of the currently not-enabled NSQT, some non-square transforms are available for non-square TUs, such as 4×16, but again notably these result in 64 coefficients, again a power of 4.

4:2:2 and 4:4:4 Transform Variants

The 4:2:2 scheme can result in non-square TUs that are not powers of 4; for example a 4×8 TU has 32 pixels, and 32 is not a power of 4.

In an embodiment of the present disclosure therefore, a non-square transform for a non-power of 4 number of coefficients may be used, acknowledging that modifications may be required to the subsequent quantisation process.

Alternatively, in an embodiment of the present disclosure non-square TUs are split into square blocks having a power of 4 area for transformation, and then the resulting coefficients can be interleaved.

For example, for 4×8 blocks (eight rows of four samples), odd/even rows of samples can be split into two square blocks, for example so that one of the square blocks takes the even rows and the other takes the odd rows. Alternatively, for 4×8 blocks the top 4×4 pixels and the bottom 4×4 pixels could form two square blocks, in other words by dividing the TU around a centre axis of the TU (a horizontal axis in this example). Alternatively again, for 4×8 blocks a Haar wavelet decomposition can be used to form a lower and an upper frequency 4×4 block. Corresponding recombining techniques are used to recombine decoded square blocks into a TU at the decoder (or in the reverse decoding path of the encoder).

Any of these options may be made available, and the selection of a particular alternative may be signalled to or derived by the decoder.

Accordingly, at the encoder side, this represents an example of a method of video coding in respect of a 4:2:2 chroma subsampling format or another format, the method comprising:

dividing image data into transform units;

in the case of a non-square transform unit, splitting the non-square transform unit into square blocks prior to applying a spatial frequency transform; and applying a spatial frequency transform to the square blocks to generate corresponding sets of spatial frequency coefficients.

In embodiments, in respect of transform units of an intra-prediction unit, the splitting step may be performed before generating predicted image data in respect of that prediction unit. This can be useful because for intra-coding, the prediction is potentially based upon recently decoded TUs which could be others from the same PU.

Optionally, the sets of spatial frequency coefficients relating to the square blocks derived from a transform unit may be recombined after the transform has been performed. But in other embodiments, the coefficients relating to the transformed square blocks may be encoded, stored and/or transmitted separately.

As discussed above, the splitting may comprise applying a Haar transform. Alternatively, in the case that the non-square transform unit is rectangular, the splitting may comprise selecting respective square blocks either side of a centre axis of the rectangular transform unit. Alternatively, in the case that the non-square transform unit is rectangular, the splitting may comprise selecting alternate rows or columns of samples of the transform unit.

In embodiments, in respect of transform units of an intra-prediction unit, the splitting step may be performed before generating predicted image data in respect of that prediction unit. This can be useful because for intra-coding, the prediction is potentially based upon recently decoded TUs which could be others from the same PU.

A 4×8 TU is an example of a rectangular TU. It is an example of a TU in which there are twice as many samples in a vertical direction as in a horizontal direction.

At the decoder side, a method of video decoding in respect of a 4:2:2 chroma subsampling format or other format may comprise applying a spatial frequency transform to blocks of spatial frequency coefficients to generate two or more corresponding square blocks of samples; and combining the two or more square blocks of samples into a non-square transform unit.

In other words, spatial frequency coefficients for the square blocks may be handled (at least by the transform process) separately, with the resulting square blocks of samples being combined into the non-square TU.

Prior to the transform process being applied, the coefficients may be delivered as respective sets (each corresponding to a square block) or as a combined set of coefficients. In the latter case, the method may include splitting a block of spatial frequency coefficients into two or more sub-blocks; and applying the spatial frequency transform separately to each of the sub-blocks.

As above, various options are proposed for the combining operation. The combining may comprise applying an inverse Haar transform. Alternatively, in the case that the non-square transform unit is rectangular, the combining may comprise concatenating the respective square blocks either side of a centre axis of the rectangular transform unit. Alternatively, in the case that the non-square transform unit is rectangular, the combining may comprise selecting alternate rows or columns of samples of the transform unit from alternate ones of the square blocks.

Other Transform Modes

In the 4:2:0 scheme there is a proposed flag (the so-called 'qpprime_y_zero_transquant_bypass_flag') allowing the residual data to be included in the bit stream losslessly (without being transformed, quantised or further filtered). In the 4:2:0 scheme the flag applies to all channels.

In an embodiment of the present disclosure, it is proposed that the flag for the luma channel is separate to the chroma channels. Hence for the 4:2:2 scheme, such flags should be provided separately for the luma channel and for the chroma channels, and for the 4:4:4 scheme, such flags should be provided either separately for the luma and chroma channels, or one flag is provided for each of the three channels. This recognises the increased chroma data rates associated with the 4:2:2 and 4:4:4 schemes, and enables, for example, lossless luma data together with compressed chroma data.

For intra-prediction coding, mode-dependent directional transform (MDDT) allows the horizontal or vertical ICT (or both ICTs) for a TU to be replaced with an Integer Sine Transform depending upon the intra-prediction direction. In the 4:2:0 scheme this is not applied to chroma TUs. However in an embodiment of the present disclosure it is proposed to apply it to 4:2:2 and 4:4:4 chroma TUs.

Quantisation

In the 4:2:0 scheme, the quantisation calculation is the same for chrominance as for luminance. Only the quantisation parameters (QPs) differ.

QPs for chrominance are calculated from the luminance QPs as follows:

$$Qp_{Cb}=\text{scalingTable}[Qp_{luminance}+\text{chroma\_qp\_index\_offset}]$$

$$Qp_{Cr}=\text{scalingTable}[Qp_{luminance}+\text{second\_chroma\_qp\_index\_offset}]$$

Where the scaling table is defined as seen in FIG. 5, and "chroma_qp_index_offset" and "second_chroma_qp_index_offset" are defined in the picture parameter set.

Chrominance channels typically contain less information than luminance and hence have smaller-magnitude coefficients; this limitation on the chrominance QP may prevent all chrominance detail being lost at heavy quantisation levels.

The QP-divisor relationship in the 4:2:0 is such that an increase of 6 in the QP is equivalent to a doubling of the divisor. Hence the largest difference in the scaling table of 51−39=12 represents a factor-of-4 change in the divisor.

However, in an embodiment of the present disclosure, for the 4:2:2 scheme, which potentially contains twice as much chroma information as the 4:2:0 scheme, the maximum chrominance QP value in the scaling table may be raised to 45 (halving the divisor). Similarly for the 4:4:4 scheme, the maximum chrominance QP value in the scaling table may be raised to 51 (the same divisor). In this case the scaling table is in effect redundant, but may be retained simply for operational efficiency (so that the system works by reference to a table in the same way for each scheme). Hence more generally in an embodiment of the present disclosure the chroma QP divisor is modified responsive to the amount of information in the coding scheme relative to the 4:2:0 scheme.

It is also notable that in the 4:2:0 scheme, the largest chroma TU is 16×16, whereas for the 4:2:2 scheme 16×32 TUs are possible, and for the 4:4:4 scheme, 32×32 chroma TUs are possible. Consequently in an embodiment of the present disclosure quantisation matrices (Qmatrices) for 32×32 chroma TUs are proposed. Similarly, Qmatrices 32×32 chroma TUs are proposed. Similarly, Qmatrices should be defined for non-square TUs such as the 16×32 TU.

Qmatrices could be defined by any one of the following:
values in a grid (as for 4×4 and 8×8 Qmatrices);
interpolated spatially from smaller or larger matrices;
   in HEVC larger Qmatrices can be derived from smaller ones,
relative to other Qmatrices (difference values, or deltas);
   hence only the deltas need to be sent,
as a function of another Qmatrix;
   for example a scaling ratio relative to another matrix, hence only the coefficients of the functions need to be sent (such as the scaling ratio),
as an equation/function (for example piece-wise linear curve, exponential, polynomial);
   hence only the coefficients of the equations need to be sent to derive the matrix,
or any combination of the above.

Other useful information includes an optional indicator of to which other matrix the values are related, the previous channel or the first (primary) channel; for example the matrix for Cr could be a scaled factor of a matrix for Y, or for Cb, as indicated.

The number of Q Matrices in HEVC 4:2:0 is currently 2 (Luma+Chroma) for each transform size. However, in an embodiment of the present disclosure 3 are provided for (Y+Cb+Cr) or (G+B+R) as applicable. Hence in the case of a 4:4:4 GBR scheme, it will be appreciated that either one set of quantisation matrices could be used for all channels, or three respective sets of quantisation matrices could be used.

A similar principle may be applied to MPEG4-SStP for GBR, where again 2 or 3 matrices per transform size maybe provided.

Entropy Encoding

Basic entropy encoding comprises assigning codewords to input data symbols, where the shortest available codewords are assigned to the most probable symbols in the input data. On average the result is a lossless but much smaller representation of the input data.

This basic scheme can be improved upon further by recognising that symbol probability is often conditional on recent prior data, and consequently making the assignment process context adaptive.

In such a scheme, context variables (CVs) are used to determine the choice of respective probability models, and such CVs are provided for in the HEVC 4:2:0 scheme.

To extend entropy encoding to the 4:2:2 scheme, which for example will use 4×8 chroma TUs rather than 4×4 TUs for an 8×8 luma TU, optionally the context variables can be provided for by simply vertically repeating the equivalent CV selections.

However, in an embodiment of the present disclosure the CV selections are not repeated for the top-left coefficients (the high-energy, DC and/or low spatial frequency coefficients), and instead new CVs are derived. In this case, for example, a mapping may be derived from the luma map. This approach may also be used for the 4:4:4 scheme.

During coding, in the 4:2:0 scheme, a so-called zig-scan scans through the coefficients in order from high to low frequencies. However, again it is noted that the chroma TUs in the 4:2:2 scheme can be non-square, and so in an embodiment of the present disclosure a different chroma zig-scan is proposed with the angle of the scan be tilted to make it more horizontal, or more generally, responsive to the aspect ratio of the TU.

Similarly, the neighbourhood for significance map CV selection and the c1/c2 system for greater-than-one and greater-than-two CV selection may be adapted accordingly.

Likewise, in an embodiment of the present disclosure the last significant coefficient position (which becomes the start point during decoding) could also be adjusted for the 4:4:4 scheme, with last-significant positions for chroma TUs being coded differentially from the last-significant position in the co-located luma TU.

The coefficient scanning can also be made prediction mode dependent for certain TU sizes. Hence a different scan order can be used for some TU sizes dependent on the intra-prediction mode.

In the 4:2:0 scheme, mode dependent coefficient scanning (MDCS) is only applied for 4×4/8×8 luma TUs and 4×4 chroma TUs for intra prediction.

In an embodiment of the present disclosure, it is proposed that in the 4:2:2 scheme MDCS is applied to 4×8 and 8×4 chroma TUs for intra prediction. Similarly, it is proposed that in the 4:4:4 scheme MDCS is applied to 8×8 and 4×4 chroma TUs.

In-Loop Filters

Deblocking

Deblocking is applied to all CU, PU and TU boundaries, and the CU/PU/TU shape is not taken into account. The filter strength and size is dependent on local statistics, and deblocking has a granularity of 8×8 Luma pixels.

Consequently it is anticipated that the current deblocking applied for the 4:2:0 scheme should also be applicable for the 4:2:2 and 4:4:4 schemes.

Sample Adaptive Offsetting

In sample adaptive offsetting (SAO) each channel is completely independent. SAO splits the image data for each channel using a quad-tree, and the resulting blocks are at least one LCU in size. The leaf blocks are aligned to LCU boundaries and each leaf can run in one of three modes, as determined by the encoder ("Central band offset", "Side band offset" or "Edge offset"). Each leaf categorises its pixels, and the encoder derives an offset value for each of the 16 categories by comparing the SAO input data to the source data. These offsets are sent to the decoder. The offset for a decoded pixel's category is added to its value to minimise the deviation from the source.

In addition, SAO is enabled or disabled at picture level; if enabled for luma, it can also be enabled separately for each chroma channel. SAO will therefore be applied to chroma only if it is applied to luma.

Consequently the process is largely transparent to the underlying block scheme and it is anticipated that the current SAO applied for the 4:2:0 scheme should also be applicable for the 4:2:2 and 4:4:4 schemes.

Adaptive Loop Filtering

In the 4:2:0 scheme, adaptive loop filtering (ALF) is disabled by default. However, in principle (if allowed) then ALF would be applied to the entire picture for chroma.

In ALF, luma samples are sorted into one of 15 categories; each category uses a different Wiener-based filter.

By contrast, in 4:2:0 chroma samples are not categorised—there is just one Wiener-based filter for Cb, and one for Cr.

Hence in an embodiment of the present disclosure, in light of the increased chroma information in the 4:2:2 and 4:4:4 schemes, it is proposed that the chroma samples are categorised; for example with 7 categories for 4:2:2 and 15 categories for 4:4:4.

Whilst in the 4:2:0 scheme ALF can be disabled for luma on a per-CU basis using an ALF control flag (down to the CU-level specified by the ALF control depth), it can only be disabled for chroma on a per-picture basis.

Consequently in an embodiment of the present disclosure, the 4:2:2 and 4:4:4 schemes are provided with one or two channel specific ALF control flags for chroma.

Syntax

In HEVC, syntax is already present to indicate 4:2:0, 4:2:2 or 4:4:4 schemes, and is indicated at the sequence level. However, in an embodiment of the present disclosure it is proposed to also indicate 4:4:4 GBR coding at this level.

HEVC Encoder

Figure 6:
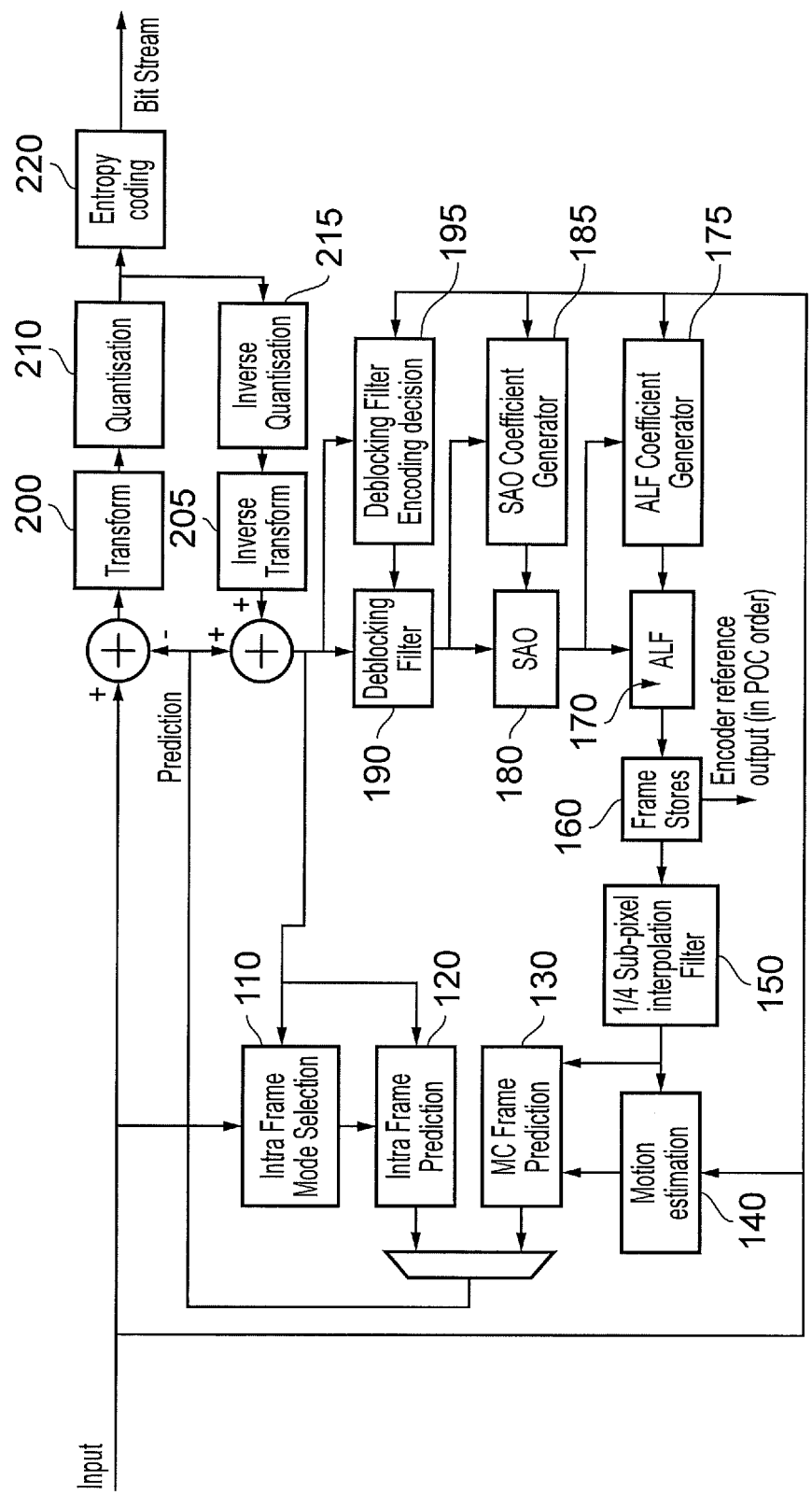
FIG. 6 is a schematic diagram of a HEVC encoder in accordance with an embodiment of the present disclosure.

Referring now to FIG. 6, in an embodiment of the present disclosure a HEVC encoder suitable for implementing the above techniques comprises an intra-frame mode selector 110 and an intra-frame mode predictor 120; a motion compensation frame predictor 130, a motion estimator 140 and a sub-pixel interpolation filter (for example a ¼ subpixel filter); frame stores 150; an adaptive loop filter 170 and an ALF coefficient generator 175; a sample adaptive offset unit 180 and SAO coefficient generator 185; a deblocking filter 190 and a deblocking filter encoding decision unit 195; a transform unit 200 and inverse transform unit 205; a quantisation unit 210 and inverse quantisation unit 215; and an entropy encoder 220.

HEVC Decoder

As discussed above, the reverse path of the decoder shown in FIG. 9 (215, 205, 190, 180, 170, 160, 150, 140, 130, 120, 110 and associated features) corresponds to the forward path of a decoder.

Accordingly a decoder corresponding to the above encoder will be readily understood by a person skilled in the art to similarly comprise an intra-frame mode selector (corresponding to the selector 110) operable to select (for example, on the basis of data supplied by the encoder as part of the encoded bitstream) an intra-prediction mode, and an intra-frame mode predictor (corresponding to the predictor 120) which, responsive to that selection, is operable to select one of a plurality of predetermined orders of transform unit processing, so as to correspond with the encoding process for that data (otherwise the transmitted residual errors would not correspond to the errors in prediction at decoding). Hence such a decoder may also implement the methods described herein.

The apparatus of FIG. 6 schematically illustrates an example embodiment of a video coding apparatus operable in respect of a 4:2:2 chroma subsampling format or indeed another format, the apparatus comprising: a divider (which may be implemented, for example by the transform unit 200) configured to divide image data into transform units; a splitter (again, implemented in the example embodiment by the transform unit 200) operable in the case of a non-square transform unit and configured to split the non-square transform unit into square blocks prior to applying a spatial frequency transform; and a spatial frequency transformer (once again, implemented in the example embodiment by the transform unit 200) configured to apply a spatial frequency transform to the square blocks to generate corresponding sets of spatial frequency coefficients.

As discussed above, features of the reverse path of the encoder of FIG. 6 are applicable to the forward path of a decoder. In embodiments of the present technology, the inverse transform unit may act, in the context of video decoding apparatus operable in respect of a 4:2:2 chroma subsampling format or another format, as each of: a spatial frequency transformer configured to apply a spatial frequency transform to blocks of spatial frequency coefficients to generate two or more corresponding square blocks of samples; and a combiner configured to combine the two or more square blocks of samples into a non-square transform unit.

A HEVC or other decoder corresponding to the above encoder will be understood by a person skilled in the art. Such a decoder may implement at least the methods summarised in FIGS. 7A-7I below.

Summary

In a summary embodiment of the present disclosure, a HEVC encoder as described above is operable to carry out methods described herein, including but not limited to the following.

Referring to FIG. 7A, in an instance of the summary embodiment, for a 4:4:4 chroma subsampling format, recursively splitting s710 a largest coding unit down to a coding unit of 4×4 pixels.

Referring to FIG. 7B, in an instance of the summary embodiment, for a 4:4:4 chroma subsampling format, providing s720 respective coding unit tree hierarchies for each channel (Y, Cb, Cr).

Referring to FIG. 7C, in an instance of the summary embodiment, for a 4:2:2 chroma subsampling format, enabling s732 non-square quad-tree transforms, enabling s734 asymmetric motion partitioning, and selecting s736 transform unit block sizes to align with a resulting asymmetric prediction unit block layout.

Referring to FIG. 7D, in an instance of the summary embodiment, for a 4:2:2 chroma subsampling format, associating s740 intra-prediction mode angles for square prediction units with different intra-prediction mode angles for non-square prediction units.

Referring to FIG. 7E, in an instance of the summary embodiment, for a 4:4:4 chroma subsampling format, providing s750 respective intra-prediction modes for two or more prediction units in a coding unit.

Figure 7F:
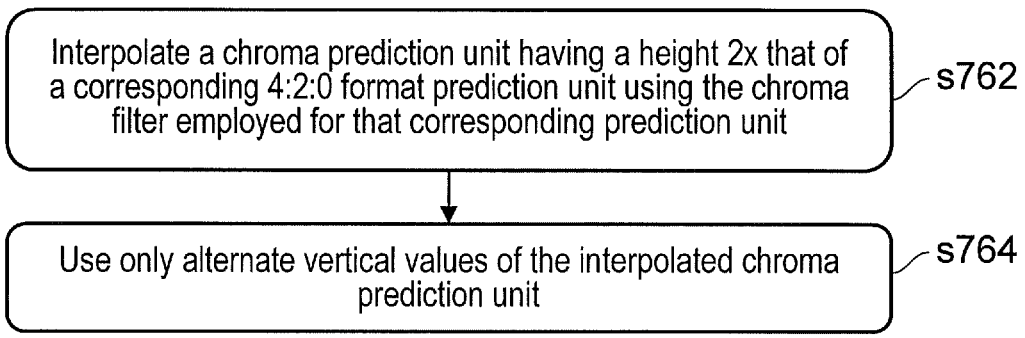
FIGS. 7A to 7T are flow diagrams for respective methods of high efficiency video coding in accordance with embodiments of the present disclosure.

Referring to FIG. 7F, in an instance of the summary embodiment, for a 4:2:2 chroma subsampling format, interpolating s762 a chroma prediction unit having a height twice that of a corresponding 4:2:0 format prediction unit using the chroma filter employed for the corresponding 4:2:0 format prediction unit, and using s764 only alternate vertical values of the interpolated chroma prediction unit.

Figure 7G:
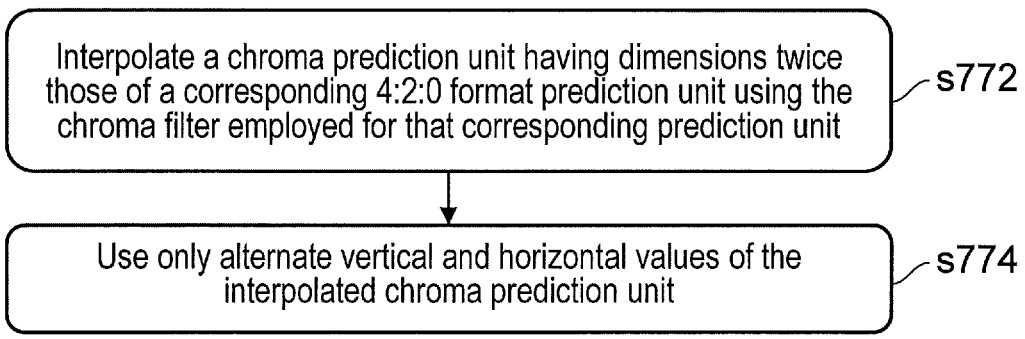

Referring to FIG. 7G, in an instance of the summary embodiment, for a 4:4:4 chroma subsampling format, interpolating s772 a chroma prediction unit having dimensions twice those of a corresponding 4:2:0 format prediction unit using the chroma filter employed for the corresponding 4:2:0 format prediction unit, and using s774 only alternate vertical and horizontal values of the interpolated chroma prediction unit.

Figure 7H:
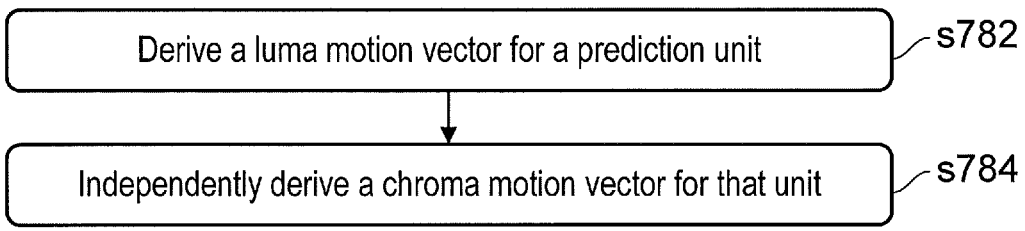

Referring to FIG. 7H, in an instance of the summary embodiment, for a 4:2:2 chroma subsampling format and/or a 4:4:4 chroma subsampling format, deriving s782 a luma motion vector for a prediction unit, and independently deriving s784 a chroma motion vector for that prediction unit.

Figure 7I:
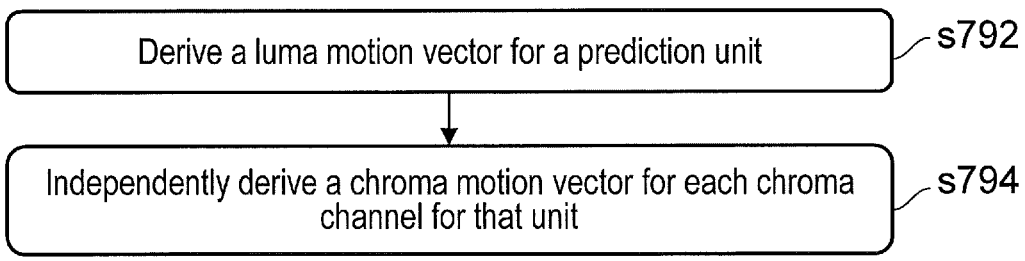

Referring to FIG. 7I, in an instance of the summary embodiment, for a 4:4:4 chroma subsampling format, deriving s792 a luma motion vector for a prediction unit, and independently deriving s794 a respective chroma motion vector for each chroma channel for the prediction unit.

Figure 7J:
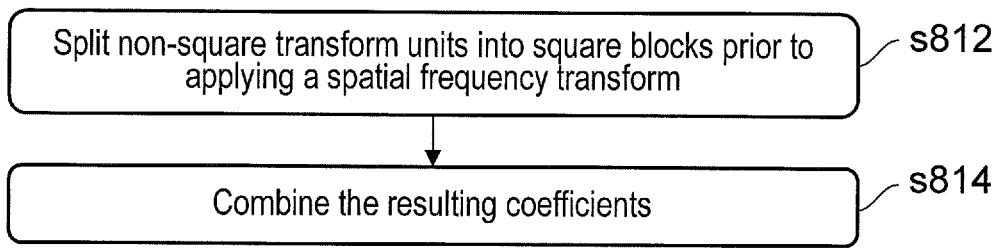

Referring to FIG. 7J, in an instance of the summary embodiment, for a 4:2:2 chroma subsampling format or another format, splitting s812 non-square transform units into square blocks prior to applying a spatial frequency transform, and then combining s814 (for example interleaving) the resulting coefficients.

Figure 7K:
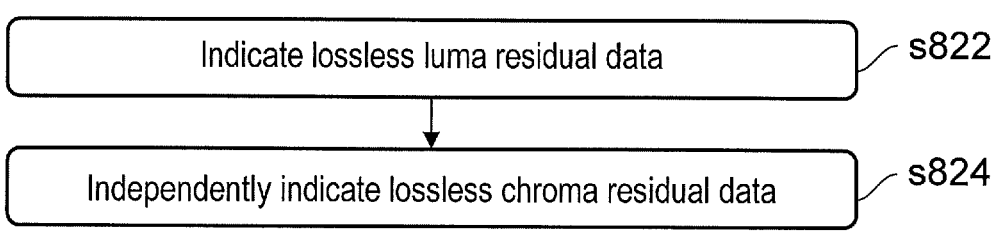

Referring to FIG. 7K, in an instance of the summary embodiment, for a 4:2:2 chroma subsampling format and/or a 4:4:4 chroma subsampling format, indicating s822 that luma residual data is to be included in a bitstream losslessly, and independently indicating s824 that chroma residual data is to be included in the bitstream losslessly.

Figure 7L:
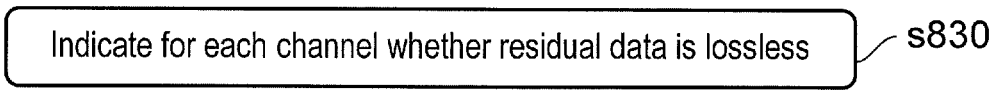

Referring to FIG. 7L, in an instance of the summary embodiment, for a 4:4:4 chroma subsampling format, independently indicating s830 for each channel whether residual data is to be included in a bitstream losslessly.

Figure 7M:
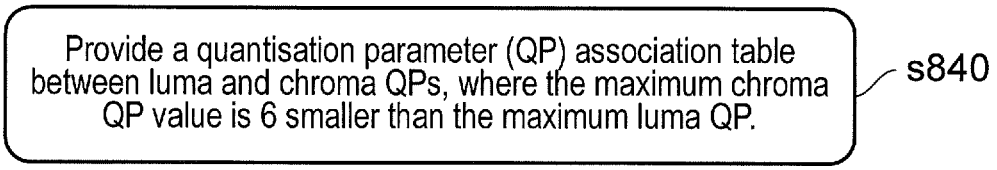
Figure 7N:
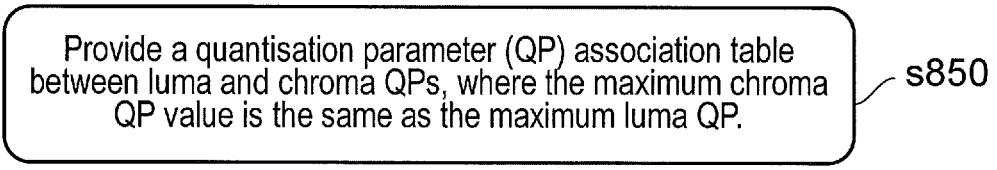

Referring to FIG. 7M, in an instance of the summary embodiment, for a 4:2:2 chroma subsampling format, providing s840 a quantisation parameter association table between luma and chroma quantisation parameters, where the maximum chroma quantisation parameter value is 6 smaller than the maximum luma quantisation parameter.

Referring to FIG. 7M, in an instance of the summary embodiment, for a 4:4:4 chroma subsampling format, providing s850 a quantisation parameter association table between luma and chroma quantisation parameters, where the maximum chroma quantisation parameter value is the same as the maximum luma quantisation parameter.

Referring to FIG. 7O, in an instance of the summary embodiment, for a 4:4:4 chroma subsampling format, using or treating s860 luma quantisation parameter values as chroma quantisation parameter values.

Referring to FIG. 7P, in an instance of the summary embodiment, for a 4:2:2 chroma subsampling format and/or a 4:4:4 chroma subsampling format, defining s870 one or more quantisation matrices as difference values with respect to quantisation matrices defined for a different (for example 4:2:0) chroma subsampling format.

Referring to FIG. 7Q, in an instance of the summary embodiment, for a 4:2:2 chroma subsampling format and/or a 4:4:4 chroma subsampling format, mapping s880 an entropy encoding context variable from a luma context variable map for use with a chroma transform unit, and entropy encoding s890 one or more coefficients of a chroma transform unit using the mapped context variable.

Referring to FIG. 7R, in an instance of the summary embodiment, for a 4:4:4 chroma subsampling format, entropy encoding s910 coefficients of luma and chroma transform units, and coding s920 the last significant position for chroma transform units differentially from the last significant position in the co-located luma transform unit.

Referring to FIG. 7S, in an instance of the summary embodiment, for a 4:2:2 chroma subsampling format and/or a 4:4:4 chroma subsampling format, enabling s930 adaptive loop filtering, and categorising s940 respective chroma samples into one of a plurality of categories each having a respective filter.

Figure 7T:
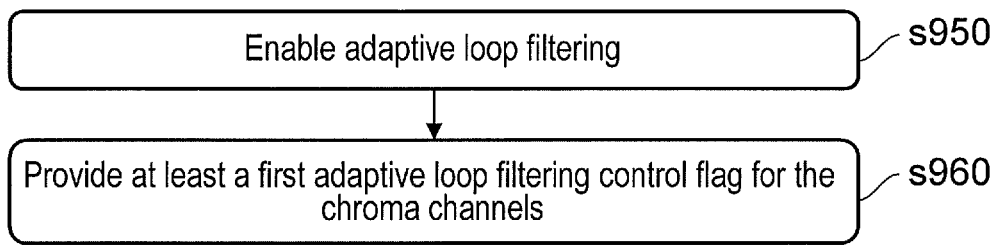

Referring to FIG. 7T, in an instance of the summary embodiment, for a 4:2:2 chroma subsampling format and/or a 4:4:4 chroma subsampling format, enabling s950 adaptive loop filtering, and providing s960 at least a first adaptive loop filtering control flag for the chroma channels (for example one for Cb and Cr together, or one for each of Cb and Cr).

Finally, it will be appreciated that the methods disclosed herein may be carried out on conventional hardware suitably adapted as applicable by software instruction and/or by the inclusion or substitution of dedicated hardware.

Thus the required adaptation to existing parts of a conventional equivalent device may be implemented in the form of a non-transitory computer program product or similar object of manufacture comprising processor implementable instructions stored on a data carrier such as a floppy disk, optical disk, hard disk, PROM, RAM, flash memory or any combination of these or other storage media, or in the form of a transmission via data signals on a network such as an Ethernet, a wireless network, the Internet, or any combination of these of other networks, or realised in hardware as an ASIC (application specific integrated circuit) or an FPGA (field programmable gate array) or other configurable circuit suitable to use in adapting the conventional equivalent device.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be apparent that numerous modifications and variations of the present disclosure are possible in light of the above teachings. It is therefore to be understood that within the scope of the appended claims, the technology may be practiced otherwise than as specifically described herein.

Embodiments of the disclosure may comprise video capture, storage, display, transmission and/or reception apparatus comprising a decoder as described above and/or an encoder as described above.

Respective aspects and features of embodiments of the present disclosure are defined by the following numbered clauses. In the following clauses, the term "high efficiency" may optionally be deleted from the wording, as it refers just to an example of the use of embodiments of the present technology.

1. A method of high efficiency video coding, comprising the steps of:
   providing a 4:4:4 chroma subsampling format;
   and for that format
   recursively splitting a largest coding unit down to a coding unit of 4×4 pixels.

2. A method of high efficiency video coding, comprising the steps of:
   providing a 4:4:4 chroma subsampling format;
   and for that format
   providing respective coding unit tree hierarchies for each channel.

3. A method of high efficiency video coding, comprising the steps of:
   providing a 4:2:2 chroma subsampling format;
   and for that format
   enabling non-square quad-tree transforms;
   enabling asymmetric motion partitioning; and
   selecting transform unit block sizes to align with a resulting asymmetric prediction unit block layout.

4. A method of high efficiency video coding, comprising the steps of:
   providing a 4:2:2 chroma subsampling format;
   and for that format,
   associating intra-prediction mode angles for square prediction units with different intra-prediction mode angles for non-square prediction units.

5. A method of high efficiency video coding, comprising the steps of:
   providing a 4:4:4 chroma subsampling format;
   and for that format,
   providing respective intra-prediction modes for two or more prediction units in a coding unit.

6. A method of high efficiency video coding, comprising the steps of:
   providing a 4:2:2 chroma subsampling format;
   and for that format,
   interpolating a chroma intra-prediction unit having a height twice that of a corresponding 4:2:0 format prediction unit using the chroma filter employed for the corresponding 4:2:0 format prediction unit; and
   using only alternate vertical values of the interpolated chroma prediction unit.

7. A method of high efficiency video coding, comprising the steps of:
   providing a 4:4:4 chroma subsampling format;
   and for that format,
   interpolating a chroma prediction unit having dimensions twice those of a corresponding 4:2:0 format prediction unit using the chroma filter employed for the corresponding 4:2:0 format prediction unit; and
   using only alternate vertical and horizontal values of the interpolated chroma prediction unit.

8. A method of high efficiency video coding, comprising the steps of:
   providing a 4:2:2 chroma subsampling format and/or a 4:4:4 chroma subsampling format;
   and for either format,
   deriving a luma motion vector for a prediction unit; and
   independently deriving a chroma motion vector for that prediction unit.

9. A method of high efficiency video coding, comprising the steps of:
   providing a 4:4:4 chroma subsampling format;
   and for that format,
   deriving a luma motion vector for a prediction unit; and
   independently deriving a respective chroma motion vector for each chroma channel for the prediction unit.

10. A method of high efficiency video coding, comprising the steps of:
    providing a 4:2:2 chroma subsampling format;
    and for that format,
    splitting non-square transform units into square blocks prior to applying a spatial frequency transform; and then
    combining the resulting coefficients.

11. A method of high efficiency video coding, comprising the steps of:
    providing a 4:2:2 chroma subsampling format and/or a 4:4:4 chroma subsampling format;
    and for either format,
    indicating that luma residual data is to be included in a bitstream losslessly; and
    independently indicating that chroma residual data is to be included in the bitstream losslessly.

12. A method of high efficiency video coding, comprising the steps of:
    providing a 4:4:4 chroma subsampling format;
    and for that format,
    independently indicating for each channel whether residual data is to be included in a bitstream losslessly.

13. A method of high efficiency video coding, comprising the steps of:
providing a 4:2:2 chroma subsampling format;
and for that format,
providing a quantisation parameter association table between luma and chroma quantisation parameters, where the maximum chroma quantisation parameter value is 6 smaller than the maximum luma quantisation parameter.

14. A method of high efficiency video coding, comprising the steps of:
providing a 4:4:4 chroma subsampling format;
and for that format,
providing a quantisation parameter association table between luma and chroma quantisation parameters, where the maximum chroma quantisation parameter value is the same as the maximum luma quantisation parameter.

15. A method of high efficiency video coding, comprising the steps of:
providing a 4:4:4 chroma subsampling format;
and for that format,
treating luma quantisation parameter values as chroma quantisation parameter values.

16. A method of high efficiency video coding, comprising the steps of:
providing a 4:2:2 chroma subsampling format and/or a 4:4:4 chroma subsampling format;
and for either format,
defining one or more quantisation matrices as difference values with respect to quantisation matrices defined for a different chroma subsampling format.

17. A method of high efficiency video coding, comprising the steps of:
providing a 4:2:2 chroma subsampling format and/or a 4:4:4 chroma subsampling format;
and for either format,
mapping an entropy encoding context variable from a luma context variable map for use with a chroma transform unit; and
entropy encoding one or more coefficients of a chroma transform unit using the mapped context variable.

18. A method of high efficiency video coding, comprising the steps of:
providing a 4:4:4 chroma subsampling format;
and for that format,
entropy encoding coefficients of luma and chroma transform units; and
coding the last significant position for chroma transform units differentially from the last significant position in the co-located luma transform unit.

19. A method of high efficiency video coding, comprising the steps of:
providing a 4:2:2 chroma subsampling format and/or a 4:4:4 chroma subsampling format;
and for either format,
enabling adaptive loop filtering; and
categorising respective chroma samples into one of a plurality of categories each having a respective filter.

20. A method of high efficiency video coding, comprising the steps of:
providing a 4:2:2 chroma subsampling format and/or a 4:4:4 chroma subsampling format;
and for either format,
enabling adaptive loop filtering; and
providing at least a first adaptive loop filtering control flag for the chroma channels.

21. A computer program for implementing the steps of any preceding method clause.

22. A high efficiency video coding encoder arranged in operation to implement the steps of any preceding method clause.

23. A high efficiency video coding decoder arranged in operation to implement the steps of any one of clauses 1 to 9.

24. A method of high efficiency video coding substantially as described herein with reference to the accompanying drawings.

25. A high efficiency video coding encoder substantially as described herein with reference to the accompanying drawings.

26. A high efficiency video coding decoder substantially as described herein with reference to the accompanying drawings.

It will be appreciated that these aspects and features, as well as the underlying embodiments to which they relate, may be applied in combination as technically appropriate.

The invention claimed is:

1. A method of video coding, comprising:
dividing, by circuitry, image data into transform units;
when a transform unit is a non-square transform unit, splitting the non-square transform unit into square blocks and applying a spatial frequency transform to the square blocks to generate corresponding sets of spatial frequency coefficients; and
associating, by the circuitry, intra-prediction mode angles for square prediction units with different intra-prediction mode angles for non-square prediction units.

2. A method according to claim 1, further comprising:
combining the sets of spatial frequency coefficients relating to the square blocks derived from a transform unit.

3. The method according to claim 1, wherein the non-square transform unit is rectangular, and the splitting comprises selecting respective square blocks on either side of a center axis of the rectangular transform unit.

4. The method according to claim 1, wherein the transform unit has twice as many samples in a vertical direction as in a horizontal direction.

5. The method according to claim 1, wherein, in respect of transform units of an intra-prediction unit, the splitting is performed before generating predicted image data in respect of the intra-prediction unit.

6. The method according to claim 1, for a 4:2:2 chroma subsampling format, further comprising:
interpolating a chroma intra-prediction unit having a height twice that of a corresponding 4:2:0 format prediction unit using a chroma filter employed for the corresponding 4:2:0 format prediction unit; and
using only alternate vertical values of the interpolated chroma prediction unit.

7. The method according to claim 1, further comprising:
deriving a luma motion vector for a prediction unit; and
independently deriving a chroma motion vector for the prediction unit.

8. The method according to claim 1, further comprising:
indicating that luma residual data is to be included in a bitstream losslessly; and
independently indicating that chroma residual data is to be included in the bitstream losslessly.

9. The method according to claim 1, further comprising:
defining one or more quantization matrices as difference values with respect to quantization matrices defined for a different chroma subsampling format.

10. A method of video decoding, comprising:
applying a spatial frequency transform to blocks of spatial frequency coefficients to generate two or more corresponding square blocks of samples; and
combining by circuitry the two or more square blocks of samples into a non-square transform unit.

11. The method according to claim 10, further comprising:
splitting a block of spatial frequency coefficients into two or more sub-blocks; and
applying the spatial frequency transform separately to each of the sub-blocks.

12. The method according to claim 10, wherein the non-square transform unit is rectangular, and the combining comprises concatenating the respective square blocks on either side of a center axis of the rectangular transform unit.

13. The method according to claim 10, wherein the transform unit has twice as many samples in a vertical direction as in a horizontal direction.

14. The method according to claim 10, wherein the video coding is in respect of a 4:2:2 chroma subsampling format.

15. A non-transitory computer readable medium including computer program instructions, which when executed by a computer causes the computer to perform the method of claim 1.

16. A video coding apparatus, comprising:
circuitry configured to divide image data into transform units;
a splitter configured to, when a transform unit is a non-square transform unit, split the non-square transform unit into square blocks; and
a spatial frequency transformer configured to apply a spatial frequency transform to the square blocks to generate corresponding sets of spatial frequency coefficients, wherein
the circuitry is further configured to associate intra-prediction mode angles for square prediction units with different intra-prediction mode angles for non-square prediction units.

17. The video coding apparatus of claim 16, configured to encode video data in a 4:2:2 chroma sampling format.

18. A video decoding apparatus, comprising:
a spatial frequency transformer configured to apply a spatial frequency transform to blocks of spatial frequency coefficients to generate two or more corresponding square blocks of samples; and
circuitry configured to combine the two or more square blocks of samples into a non-square transform unit.

19. The video decoding apparatus of claim 18, configured to decode video data in a 4:2:2 chroma sampling format.

20. A video capture, storage, display, transmission and/or reception apparatus comprising the coding apparatus according to claim 16.

21. A video capture, storage, display, transmission and/or reception apparatus comprising the decoding apparatus according to claim 18.

* * * * *